United States Patent
Alkove et al.

(10) Patent No.: US 7,581,255 B2
(45) Date of Patent: Aug. 25, 2009

(54) SYSTEMS AND METHODS FOR LICENSING ONE OR MORE DATA STREAMS FROM AN ENCODED DIGITAL MEDIA FILE

(75) Inventors: James M. Alkove, Woodinville, WA (US); Cory R. West, Central Point, OR (US)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 10/349,388

(22) Filed: Jan. 21, 2003

(65) Prior Publication Data

US 2004/0143760 A1 Jul. 22, 2004

(51) Int. Cl.
*G06F 19/00* (2006.01)
*G11C 7/00* (2006.01)

(52) U.S. Cl. .................. 726/26; 726/21; 380/201
(58) Field of Classification Search ............ 726/21, 726/26; 380/201
See application file for complete search history.

(56) References Cited

U.S. PATENT DOCUMENTS

| | | | | |
|---|---|---|---|---|
| 6,865,555 | B2* | 3/2005 | Novak ................. | 705/59 |
| 7,191,332 | B1* | 3/2007 | Pankajakshan et al. ...... | 713/163 |
| 2002/0019814 | A1* | 2/2002 | Ganesan ................... | 705/59 |
| 2002/0054087 | A1* | 5/2002 | Noll et al. ................ | 345/744 |
| 2002/0116517 | A1* | 8/2002 | Hudson et al. ............. | 709/231 |
| 2002/0188570 | A1* | 12/2002 | Holliman et al. ........... | 705/57 |
| 2004/0039834 | A1* | 2/2004 | Saunders et al. ........... | 709/231 |
| 2004/0054912 | A1* | 3/2004 | Adent et al. .............. | 713/181 |
| 2004/0054920 | A1* | 3/2004 | Wilson et al. ............. | 713/200 |
| 2004/0059929 | A1* | 3/2004 | Rodgers et al. ........... | 713/193 |
| 2004/0068536 | A1* | 4/2004 | Demers et al. ............ | 709/201 |
| 2004/0083487 | A1* | 4/2004 | Collens et al. ............ | 725/31 |
| 2004/0196972 | A1* | 10/2004 | Zhu et al. ................. | 380/45 |
| 2004/0220926 | A1* | 11/2004 | Lamkin et al. ............. | 707/3 |
| 2005/0002525 | A1* | 1/2005 | Alkove et al. ............. | 380/37 |
| 2005/0039034 | A1* | 2/2005 | Doyle et al. .............. | 713/193 |
| 2005/0066353 | A1* | 3/2005 | Fransdonk ................ | 725/29 |
| 2005/0086501 | A1* | 4/2005 | Woo et al. ................ | 713/189 |
| 2005/0091488 | A1* | 4/2005 | Dunbar et al. ............ | 713/165 |
| 2005/0125358 | A1* | 6/2005 | Levin et al. .............. | 705/59 |
| 2005/0132295 | A1* | 6/2005 | Noll et al. ................ | 715/744 |
| 2005/0278259 | A1* | 12/2005 | Gunaseelan et al. ........ | 705/59 |
| 2006/0015945 | A1* | 1/2006 | Fields ..................... | 726/27 |
| 2006/0235800 | A1* | 10/2006 | Furlong et al. ............ | 705/59 |
| 2006/0242079 | A1* | 10/2006 | Evans et al. .............. | 705/59 |
| 2007/0180136 | A1* | 8/2007 | Li et al. .................. | 709/231 |
| 2007/0192789 | A1* | 8/2007 | Medford .................. | 725/31 |

* cited by examiner

*Primary Examiner*—Emmanuel L Moise
*Assistant Examiner*—Tamara Teslovich
(74) *Attorney, Agent, or Firm*—Lee & Hayes, PLLC (57) ABSTRACT

Systems and methods to license combinations of one or more data streams from an encoded file including multiple data streams are described. In one aspect, the encoded file is accessed from a data source. A header is generated to specify a first group of one or more data streams for licensing independent of a second group of one or more data streams. The data stream content in the first group is not equivalent to the data stream content of the second group. A number of business rules are identified to indicate respective licensing strategies for the data streams in the first and second groups. A data file is generated to encapsulate the header and an encrypted version of the encoded media. An end-user is provided access to the data streams in the first and/or second groups via the data file and the header according to the respective licensing strategies.

20 Claims, 4 Drawing Sheets

SYSTEMS AND METHODS FOR LICENSING ONE OR MORE DATA STREAMS FROM AN ENCODED DIGITAL MEDIA FILE

TECHNICAL FIELD

The invention relates to distribution of digital content to consumers. In particular, the invention pertains to providing Digital Rights Management for respective portions of a digital content package.

BACKGROUND

In today's environment of peer-to-peer file sharing and music piracy over the Internet, copyright protection is of the utmost concern for content owners and distributors. Digital Rights Management (DRM) technology, which includes content packaging, distribution, and licensing processes, helps content owners protect their digital media and manage its use by customers. DRM content packaging, distribution, and licensing process begins with encoding digital media content into a file, for example, an Advanced Streaming Format (ASF) file. ASF allows multiple different streams of digital data to be stored into a single file. Since each stream of digital data corresponds to a single type of media such as audio, video, metadata, and so on, an encoded file may consist of multiple independent sources of digital content.

Existing DRM processes encrypt the encoded file and define one or more business rules. The business rules indicate end-user licensing terms or options for accessing the media content in the encrypted file. Existing DRM processes typically provide a user interface (UI) for the content owner or an administrative entity to define these business rules. The business rules and information for decrypting the encrypted file are communicated to a license issuer. The encrypted file is distributed to consumers through the Internet, CD, or other conventional means. Consumers are then issued a license via the license issuer to decode and use the contents of the encrypted file according to the corresponding defined business rules. Once acquired, a license provides the license holder with access to all portions of the encrypted file. This is the case, regardless of how many separate data streams such as audio, video, and metadata streams are represented within the encrypted file.

Since digital media rights are of substantial value, a content owner may consider one file data stream or portion to be of independent value as compared to a different data portion of the same file. For example, the content owner may consider the video portion of a file to be of higher or independent value as compared to an audio portion in the file. Unfortunately, existing DRM techniques and encoded data file formats do not allow the content owner to respectively differentiate the licensing value of one file data portion from another file data portion. Rather all file data portions are collectively licensed as a single entity. That is all file portions can be licensed according to one or multiple defined licensing schemes (business rules) or no file portions are licensed.

The following systems and methods address these and other limitations of conventional DRM systems and techniques, which require content owners that desire to secure digital rights to file contents to license multiple potentially separately valuable aspects of the file as a single collective entity.

SUMMARY

Systems and methods to license combinations of one or more data streams from an encoded file including multiple data streams are described. In one aspect, the encoded file is accessed from a data source. A header is generated to specify a first group of one or more data streams for licensing independent of a second group of one or more data streams. The data stream content in the first group is not equivalent to the data stream content of the second group. A number of business rules are identified to indicate respective licensing strategies for the data streams in the first and second groups. A data file is generated with the header and an encrypted version of the encoded media. An end-user is provided access to the data streams in the first and/or second groups via the data file and the header according to the respective licensing strategies.

BRIEF DESCRIPTION OF THE DRAWINGS

The detailed description is described with reference to the accompanying figures.

DETAILED DESCRIPTION

Overview

The following systems and methods allow a content owner to implement any number of different business models to license one or more respective data streams represented in an encoded digital media data file. The content owner can respectively differentiate the licensing value of one data portion of the encoded file from another portion of the encoded file. Such individualized data stream packaging and licensing is in contrast to existing DRM systems and techniques that require content owners that wish to use to use DRM to package all data streams in a single encoded data file for licensing to an end-user as a single entity.

An Exemplary Operating Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Program modules generally include routines, programs, objects, components, data structures, etc., that perform particular tasks or implement particular abstract data types.

Figure 1:
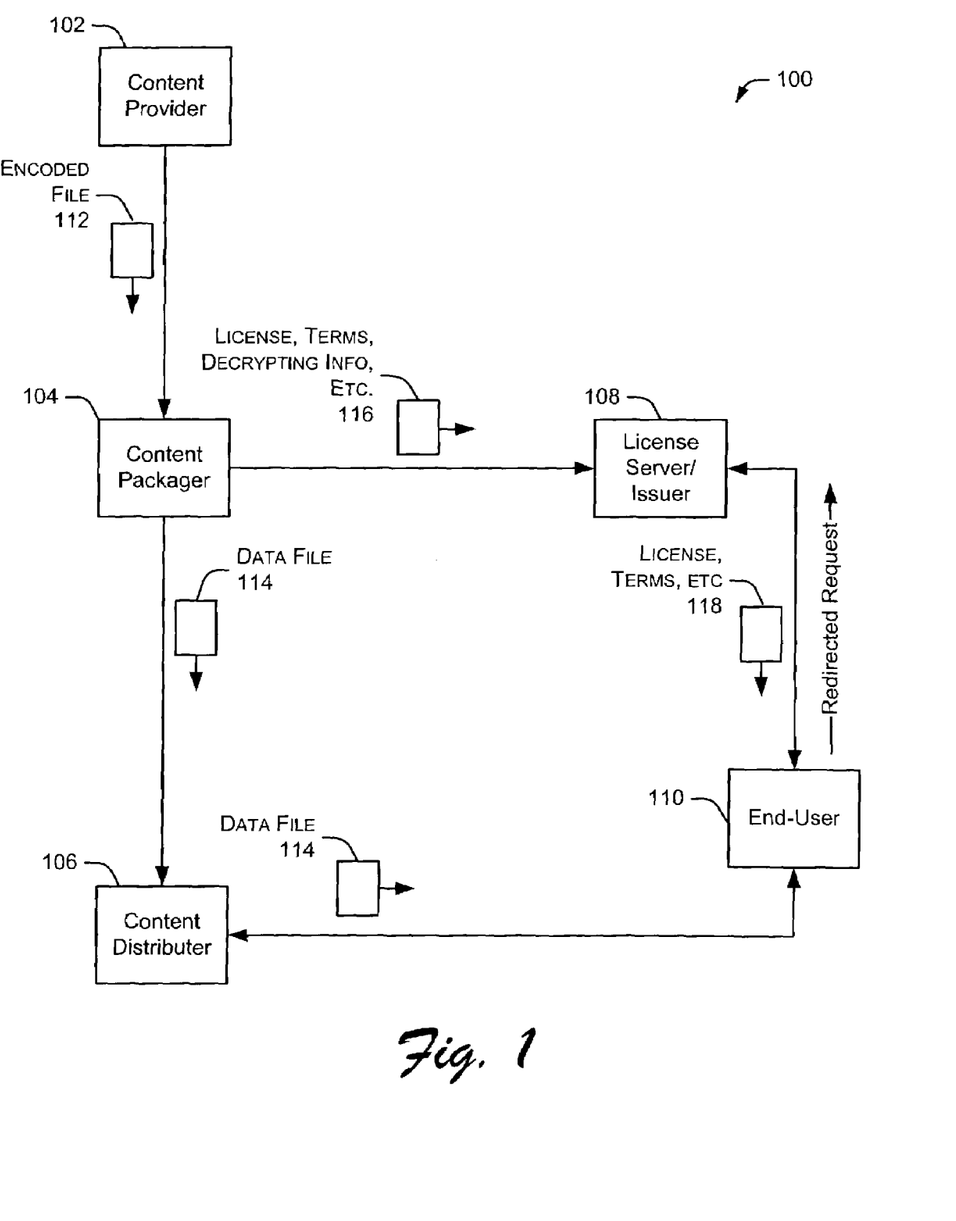
FIG. 1 is a block diagram showing an exemplary computing environment within which the described systems, apparatuses and methods to generate and license customized data stream groups from a single digital media file may be implemented.

FIG. 1 is a block diagram showing an exemplary computing environment 100 within which the described systems, apparatuses and methods to generate and license customized data stream groups from a single digital media file may be implemented. Exemplary computing environment 100 is only one example of a suitable computing environment and is not intended to suggest any limitation as to the scope of use or functionality of systems and methods described herein. Neither should computing environment 100 be interpreted as having any dependency or requirement relating to any one or combination of components illustrated in computing environment 100.

As shown in FIG. 1, computing environment 100 includes general-purpose computing devices in the forms content provider 102, content packager 104, content distributor 106, license server/issuer 108, and end-user 110. Although shown in FIG. 1 as separate components, the content provider and the content packager may reside in a single computing device to provide the functionality described below. The content provider is any type of computing device such as a personal computer (PC) used as a data source for presenting an encoded digital media file 112 to the content packager. The encoded digital media file is a single file that includes multiple streams of digital data such as any combination of video, audio, and/or metadata data streams.

Content packager 104 allows an administrative entity such as the content owner to group one or more of the respective data streams in encoded file 112 for licensing as one or more groups to end-user 110. For example, the content packager provides for packaging all data streams into a single group for licensing as a single entity, and for specifying multiple independent groups including particular ones of the data streams. The one of the multiple independent groups may or may not have the same or equivalent data streams associated therewith as compared to the data streams associated with a different one of the multiple independent groups. Such grouping or packaging is specified in a data stream DRM header 202 (FIG. 2), which is described in greater detail below in reference to FIG. 2. The content packager further provides for assigning specific portions of metadata to particular ones of the defined video, audio, and/or other content groups. Each group of the multiple independent groups is separately licensable and may include any combination of one or more of the available data streams.

Content packager 104 encrypts encoded data file 112. Any of a number of known data encryption techniques can be used to encrypt the encoded data file. The content packager packages the header (see, header 202 of FIG. 2) with the encoded data file to generate data file 114. The header identifies each of the one or more packaged data stream groups. In one implementation, the header is also encrypted. The content packager forwards the data file to content distributor 106. As discussed below, the content distributor provides for communicating the data file to end-user 110 through the Internet, CD, or other conventional means. The end-user accesses data file contents according to one or more business rules or licensing terms/options.

Content packager 104 defines the particular business rules or licensing terms that correspond to each of the one or more specified groups of the data stream content represented in data file 114. In one implementation, an administrative entity such as a content owner interfaces with a user interface (UI) provided by the content packager for defining such business rules on extensible and customizable levels of granularity, such as on a per data stream group basis. These business rules along with information indicating how to decrypt corresponding information in the data file are communicated as one or more electronic files or packets 116 to license server 110.

When end-user 110 attempts to access, via content distributor 106, any data streams associated with data file 114, the content distributor redirects the end-user request to license server/issuer 108 so that the end-user may obtain a license to view the corresponding data streams. The license server interfaces with the end-user in any of a number of possible ways to provide license 118 to the end user. The license allows the end-user to access one or more of the corresponding data streams in data file 114 according to the license terms provided by business rules 116. In other words, once acquired, license 118 provides end-user 110, or the license holder, with access to the licensed portions of data file 114. The licensed portions of this example may be all or the data streams in the file or defined subsets of the data streams in the file, depending on which of terms 116 have been met by the end-user.

In this manner, system 100 allows a content owner to implement any number of different business models to license one or more of the respective data streams represented in encoded data file 112. The content owner can respectively differentiate the licensing value of one data portion of the encoded file from another portion of the encoded file. Note that such individualized data stream packaging and licensing is in contrast to existing DRM systems and techniques that require content owners to package all data streams in a single encoded data file for licensing to an end-user as a single entity.

Figure 2:
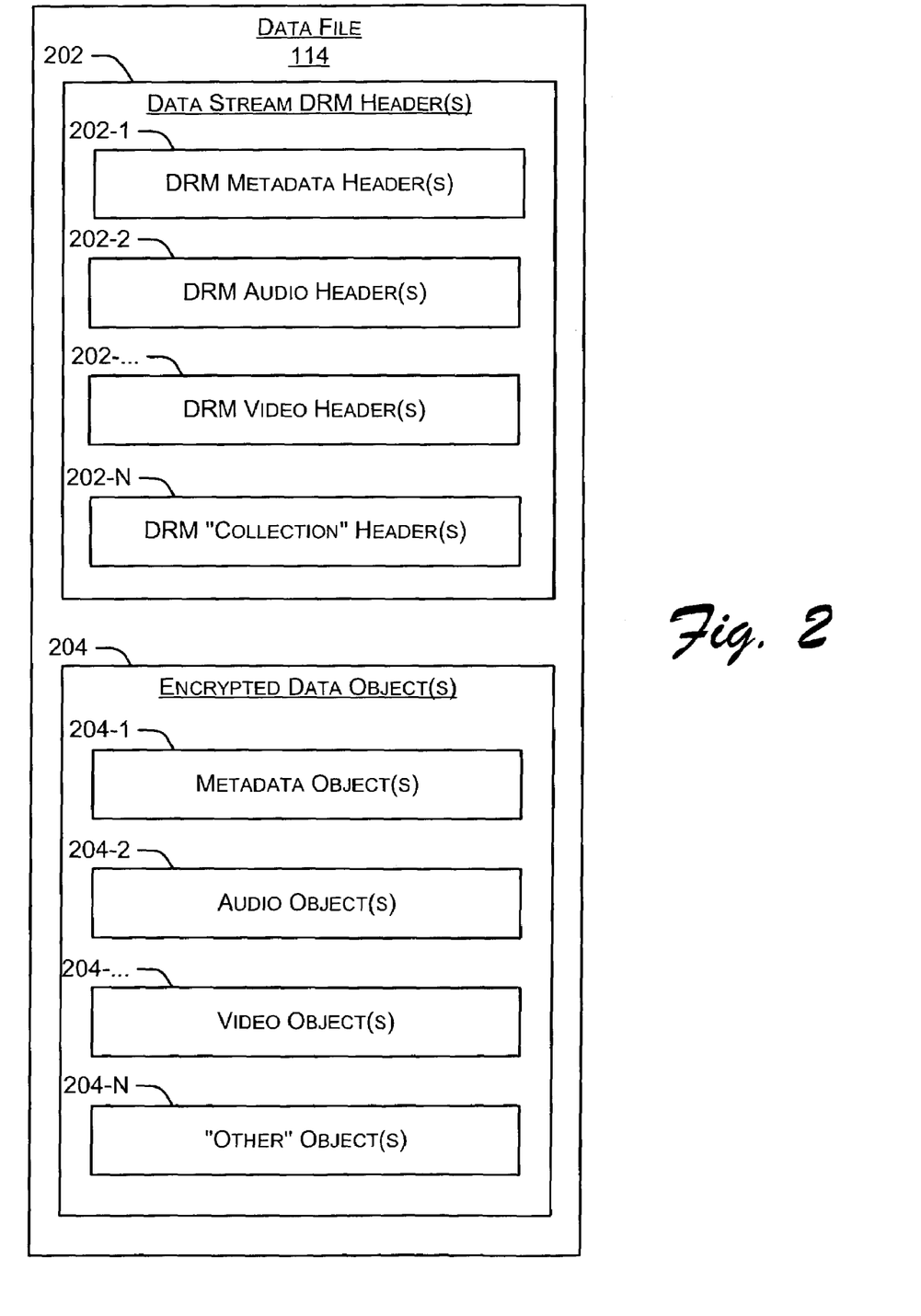
FIG. 2 shows a block diagram of a data file of FIG. 1 for independent encrypting and licensing of one or more data streams provided by an encoded data file.

FIG. 2 shows a block diagram of the data file 114 of FIG. 1 for independent encrypting and licensing of one or more data streams provided by an encoded data file. For purposes of discussion, the components of FIG. 2 are discussed in reference to various components of FIG. 1. The data file includes data stream DRM header(s) 202 and encrypted data objects 204. Each header 202 provides respective information for a collection of one or more data streams specified as a separate group for licensing, as discussed above with respect to content packager 104 (FIG. 1). For example, TABLE 1 shows aspects of an exemplary data stream header object 202 (i.e., any one of DRM "data stream" headers 202-1 through 202-N).

TABLE 1

An Exemplary Data Stream Header

```
<DRMHEADERS>
  <STREAMSID = "ID(S)" # e.g., encrypted object(s) for which this
                      # particular header applies
    <ENCRYPTION_GROUP_HEADER>
      <DATA>
        <PROTECTINFO> # algorithm ID, key length, etc.
          ...
        </PROTECTINFO>
        <LAINFO> http://content.recipricol.com/reg.asp</LAINFO>
        <CID> "" </CID>
        <OWNERID> "ownerID" </OWNERID>
        <OWNERNAME> "ownername" </OWNERNAME>
        <ATTRIBUTES>  # title, artist, etc.
          ...
        </ATTRIBUTES>
        <SIGNATURE> # e.g., algorithms, public key, etc.
          ...
        </SIGNATURE>
        ...
      </DATA>
    <ENCRYPTION GROUP HEADER>
  </STREAM_ID>
  ...
</DRMHEADERS>
```

Tag components of the exemplary data stream header 202 shown in TABLE 1 are presented in Extensible Markup Language (XML) data format and are described as follows:

DRMHEADERS—the beginning of the data stream header(s) data structure 202 of FIG. 2.

STREAM_ID—specifies the particular data stream(s) that are to be licensed/decrypted based on the information provided in the immediately following ENCRYPTION_

GROUP_HEADER. Each data stream ID corresponds to a respective one of the encrypted data objects 204. In one implementation, if STREAM_ID is set to "ALL", then the information provided in the immediately following ENCRYPTION_GROUP_HEADER is applied to all data streams in the file. If a particular data stream ID is identified, then the information provided in the immediately following ENCRYPTION_GROUP_HEADER applies to the specified data stream (i.e., encrypted data object 204). A data stream(s) ID that is not identified with a corresponding STREAM_ID parameter are stored in the clear (not encrypted). The STREAM_ID property can also be set to a list of data stream IDs so that the same ENCRYPTION_GROUP_HEADER information will be applied to all data stream IDs in the list.

ENCRYPTION_GROUP_HEADER—delimits the beginning of the information that will apply to each encrypted objects 204 specified by the immediately preceding STREAM_ID parameter. Such information includes, for example, the exemplary information encapsulated via the <DATA> and <SIGNATURE> tag pairs (a tag pair ends with the name of the tag preceded with a forward slash "/"). For instance, LAINFO tag indicates where an end-user is to be redirected to obtain a license to view the corresponding encrypted content. It can be appreciated that other types of information such as media content specific information, tracking information, and so on, may be specified in for an encryption group.

Depending on the particular data streams provided by encoded data file 112 (FIG. 1), there can be any of one or more of the different data stream headers 202 of FIG. 2 as a function of how the various data streams are packaged by the content packager 204. That is there can be a one-to-one or a one to many mapping of a DRM header 202 to specific encrypted data object(s) 204. A one-to-many mapping, for example, lists the header information 202 that maps to a list of encrypted data objects 204 (e.g., video, metadata, audio, and/or other). In the particular example of FIG. 2, there is a one-to-one mapping of DRM metadata header 202-1 to metadata object 204-1, DRM audio header 204-2 to audio object 204-2, and DRM video header 202- . . . to video object 204- . . . .

Figure 3:
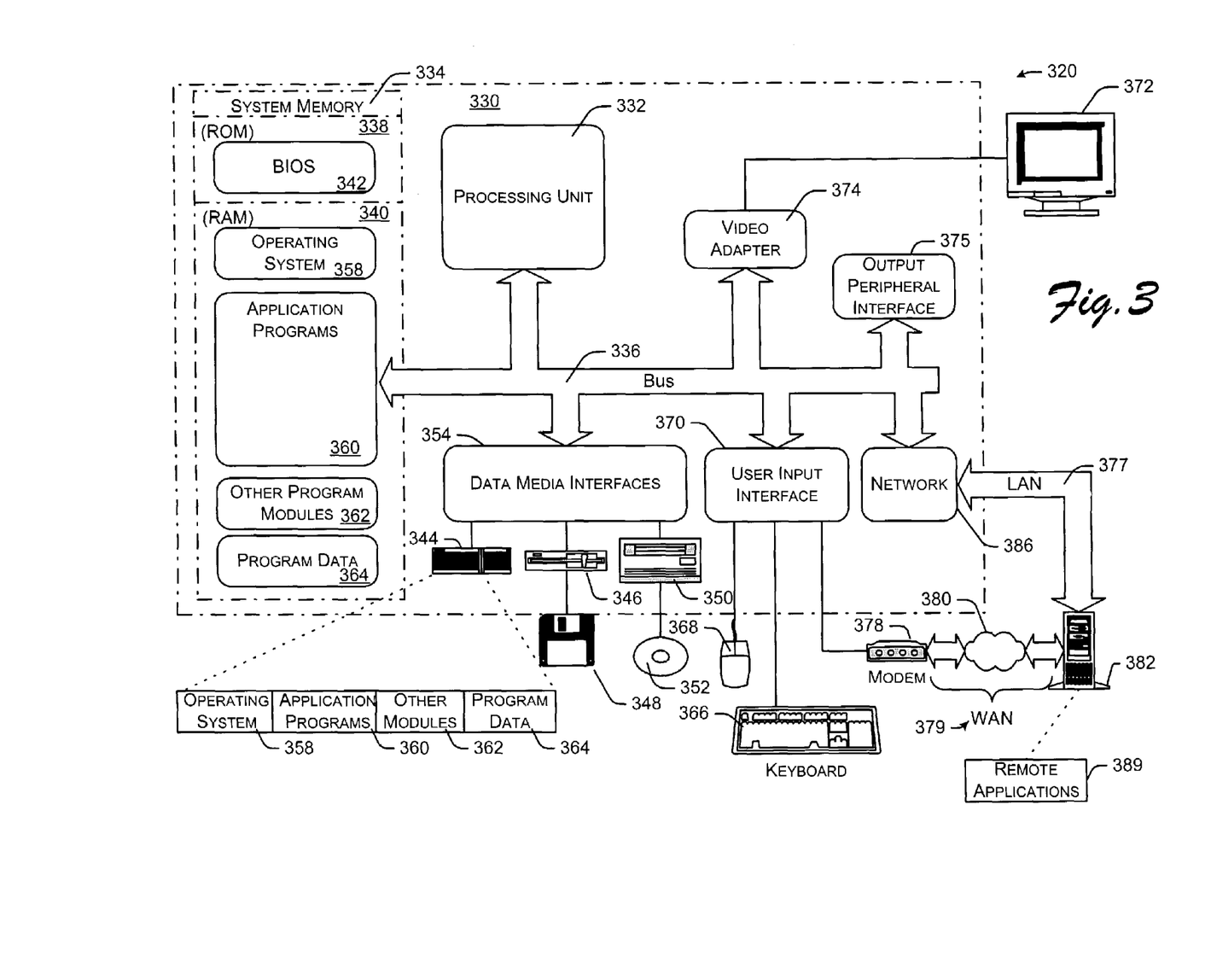
FIG. 3 is a block diagram showing an exemplary computing environment on which the described systems, apparatuses and methods to license various combinations of one or more data streams from an encoded digital media file may be implemented.

In light of the above, data stream DRM header(s) 202 may include respective metadata headers 202-1 for individual ones of video, audio, and/or other encrypted data objects 204-2 through 204-N. In this manner, metadata associated with other respective data streams can be licensed accordingly. For example, a content owner can define a DRM video metadata header that maps to encrypted DRM video metadata. The content owner can then separately license the video metadata separate and as a value added aspect to a user that has already licensed the encoded video object. Although this example is directed to licensing video metadata separate from encrypted video objects, any other type of data stream combinations (e.g., audio, and so on) can be defined. FIG. 3 is a block diagram showing an exemplary computing environment 320 on which the described systems, apparatuses and methods to license various combinations of one or more data streams from an encoded digital media file may be implemented. The computing environment 320 includes a general-purpose computing device in the form of a computer 330. For purposes of this discussion, the following described aspects of the computing device 330 are illustrative of aspects of the computing devices of FIG. 1, which include, for example, content provider 102, content packager 104, content distributor 106, license server 108, and/or end-user 110. As discussed above, the functions of the content provider and the content packager may be implemented in a single computing device or separately. Examples of well known computing systems, environments, and/or configurations that may be suitable for such devices include, but are not limited to, including handheld devices, multi-processor systems, microprocessor based or programmable consumer electronics, network PCs, mini-computers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 3, the components of computer 330 may include one or more processors or processing units 332, a system memory 334, and a bus 336 that couples various system components including system memory 334 to processor 332. Bus 336 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 330 typically includes a variety of computer readable media. Such media may be any available media that is accessible by computer 330, and it includes both volatile and non-volatile media, removable and non-removable media. In FIG. 3, system memory 334 includes computer readable media in the form of volatile memory, such as random access memory (RAM) 340, and/or non-volatile memory, such as read only memory (ROM) 338. A basic input/output system (BIOS) 342, containing the basic routines that help to transfer information between elements within computer 330, such as during start-up, is stored in ROM 338. RAM 340 typically contains data and/or program modules that are immediately accessible to and/or presently being operated on by processor 332.

Computer 330 may further include other removable/non-removable, volatile/non-volatile computer storage media. For example, FIG. 3 illustrates a hard disk drive 344 for reading from and writing to a non-removable, non-volatile magnetic media (not shown and typically called a "hard drive"), a magnetic disk drive 346 for reading from and writing to a removable, non-volatile magnetic disk 348 (e.g., a "floppy disk"), and an optical disk drive 350 for reading from or writing to a removable, non-volatile optical disk 352 such as a CD-ROM/R/RW, DVD-ROM/R/RW/+R/RAM or other optical media. Hard disk drive 344, magnetic disk drive 346 and optical disk drive 350 are each connected to bus 336 by one or more interfaces 354.

The drives and associated computer-readable media provide nonvolatile storage of computer readable instructions, data structures, program modules, and other data for computer 330. Although the exemplary environment described herein employs a hard disk, a removable magnetic disk 348 and a removable optical disk 352, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 348, optical disk 352, ROM 338, or RAM 340, including, e.g., an operating system 358, one or more application programs 360, other program modules 362, and program data 364. The systems and methods described herein provide digital rights management (DRM) that enables a content owner to license respective portions of a single content package. These systems and methods may be implemented within operating system 358, one or more application programs 360, other program modules 362, and/or program data 364. Such program modules 360 include, for example, computer-program instructions for performing operations of content manager 104 (FIG. 1), content distributor 106 (FIG. 1), license server 108 (FIG. 1), and/or end-user 110 (FIG. 1). Such program data 364 includes, for example, encoded file 112 (FIG. 1), data file 114 (FIG. 1), licensing terms and decrypting information 116 (FIG. 1), and/or license 118 (FIG. 1).

A user may provide commands and information into computer 330 through input devices such as keyboard 366 and pointing device 368 (such as a "mouse"). Other input devices (not shown) may include a microphone, joystick, game pad, satellite dish, serial port, scanner, camera, etc. These and other input devices are connected to the processing unit 332 through a user input interface 370 that is coupled to bus 336, but may be connected by other interface and bus structures, such as a parallel port, game port, or a universal serial bus (USB).

A monitor 372 or other type of display device is also connected to bus 336 via an interface, such as a video adapter 374. In the example of content packager 104 (FIG. 1), a content owner may define business rules for licensing respective portions (i.e., one or more data streams) of a single digital data file by interfacing with a UI presented via the monitor, voice activated interfaces, the described input devices, and so on. In addition to monitor 372, personal computers typically include other peripheral output devices (not shown), such as speakers and printers, which may be connected through I/O peripheral interface 375.

Computer 330 typically operates in a networked environment using logical connections to one or more remote computers, such as a remote computer 382. Remote computer 382 may include many or all of the elements and features described herein relative to computer 330. Logical connections shown in FIG. 3 are a local area network (LAN) 377 and a general wide area network (WAN) 379. Such networking environments are commonplace in offices, enterprise-wide computer networks, intranets, and the Internet.

When used in a LAN networking environment, computer 330 is connected to LAN 377 via network interface or adapter 386. When used in a WAN networking environment, the computer typically includes a modem 378 or other means for establishing communications over WAN 379. Modem 378, which may be internal or external, may be connected to system bus 336 via the user input interface 370 or other appropriate mechanism.

Depicted in FIG. 3, is a specific implementation of a WAN via the Internet. Here, computer 330 employs modem 378 to establish communications with at least one remote computer 382 via the Internet 380. In a networked environment, program modules depicted relative to computer 330, or portions thereof, may be stored in a remote memory storage device. Thus, e.g., as depicted in FIG. 3, remote application programs 389 may reside on a memory device of remote computer 382.

It will be appreciated that the network connections shown and described are exemplary and other means of establishing a communications link between the computers may be used.

An Exemplary Procedure

Figure 4:
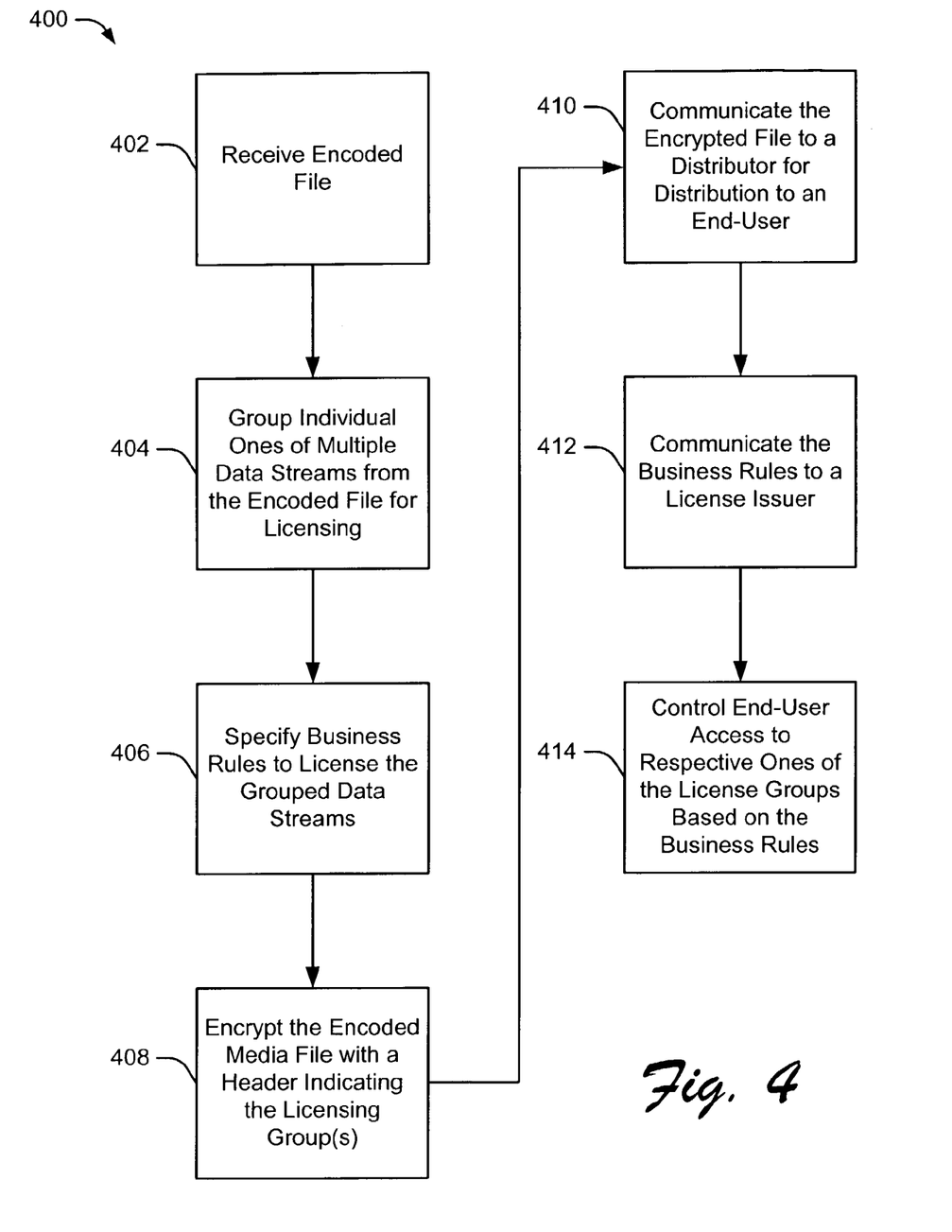
FIG. 4 is a flow diagram showing an exemplary procedure to license a customizable number of data streams from an encoded digital media file.

FIG. 4 is a flow diagram showing an exemplary procedure 400 to license a customizable number of data streams from an encoded digital media file. For purposes of discussion, operations of the procedure are described while referencing various components from FIGS. 1-3. At block 402, content packager 104 (FIG. 1) receives encoded digital media file 112 (FIG. 1). At block 404, the content packager arranges individual ones of multiple data streams from the encoded file into one or more groups for licensing. For example, respective ones of the data stream DRM headers 202 (FIG. 2) represent individual groups of one or more data stream headers for licensing corresponding ones of the encrypted data objects 204 (FIG. 2).

At block 406, content packager 104 (FIG. 1) specifies business rules 116 (FIG. 1) to license the grouped data streams. At block 408, the content packager encrypts the encoded media file with a header 202 (FIG. 2) that indicates the grouped data streams, thereby generating data file 114 (FIG. 1). At block 410, the content packager communicates the data file to content distributor 106 (FIG. 1) for distribution to end-user 110 (FIG. 1). At block 412, the content packager communicates the business rules to license issuer 108 (FIG. 1). At block 414, the content distributor in combination with a license issuer control end-user access to respective ones of the license groups based on the business rules.

Conclusion

The described systems and methods provide for licensing one or more data streams from an encoded digital media file. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. In a computer system coupled to a data source, a method comprising:
   accessing an encoded media file from the data source, the encoded media file comprising multiple data streams, each data stream representing a respective source of digital content that is different from source(s) associated with other respective ones of the data streams;
   creating a plurality of groups comprising at least a first group and a second group, wherein:
   each one of the plurality of groups comprises one or more individual ones of the multiple data streams in the encoded media file, and
   each of the plurality of groups is independent of one another in that a combination of data streams in any one of the plurality of groups is not equivalent to a combination of data streams in any other one of the plurality of groups;
   identifying a plurality of business rules comprising at least a first business rule and a second business rule, the first business rule being different than the second business rule, the plurality of business rules each providing a license strategy that indicates one or more of end-user licensing terms and options for accessing one group of the data streams;

generating a Digital Rights Management (DRM) header, the DRM header having information mapping the plurality of business rules to the plurality of groups of data streams, the mapping comprising:
   associating the first group of data streams with the first business rule; and
   associating the second group of data streams with the second business rule,
creating a data file comprising the DRM header and an encrypted version of the plurality of groups of data streams, the creating comprising:
   encrypting the plurality of groups of data streams including the first and the second group of data streams; and
   combining the DRM header with the plurality of encrypted groups of data streams to form the data file; and
providing an end-user, based on a plurality of different licenses comprising a first license and a second license, individual access to each of the plurality of encrypted groups of data streams comprising the encrypted first group of data streams and the encrypted second group of data streams in the data file via the DRM header in the data file, wherein:
   access of the encrypted first group of data streams is obtained through the end-user acquiring the first license that specifies a license strategy corresponding to the first business rule, and
   access of the encrypted second group of data streams is obtained through the end-user acquiring the second license that specifies a license strategy corresponding to the second business rule.

2. The method of claim 1, wherein the multiple data streams comprise any combination of one or more video, audio, and/or metadata data stream.

3. The method of claim 1, wherein the first group includes a metadata data stream, wherein the second group includes a different data stream of the data streams, the different data stream not being the metadata data stream, and wherein the metadata data stream is a value added aspect of the different data stream.

4. The method of claim 1 further comprising:
   communicating the first and second business rules to a license server; and
   sending the data file to a content distributor;
   wherein the license server and the content distributor are part of a Digital Rights Management computing system.

5. A tangible computer-readable data storage medium comprising computer-program instructions executable by a processor in a computer system, the computer-program instructions comprising instructions for performing a method comprising:
   accessing an encoded media file from a data source, the encoded media file comprising multiple data streams, each data stream representing a respective source of digital content that is different from source(s) associated with other respective ones of the data streams;
   creating a plurality of groups comprising at least a first group and a second group, wherein:
      each one of the plurality of groups comprises one or more individual ones of the multiple data streams in the encoded media file, and
      each of the plurality of groups is independent of one another in that a combination of data streams in any one of the plurality of groups is not equivalent to a combination of data streams in any other one of the plurality of groups;
   identifying a plurality of business rules comprising at least a first business rule and a second business rule, the first business rule being different than the second business rule, the plurality of business rules each providing a license strategy that indicates one or more of end-user licensing terms and options for accessing one group of the data streams;
   generating a Digital Rights Management (DRM) header, the DRM header having information mapping the plurality of business rules to the plurality of groups of data streams, the mapping comprising:
      associating the first group of data streams with the first business rule; and
      associating the second group of data streams with the second business rule;
      wherein the DRM header is presented in eXtensible Markup Language (XML) data format;
   creating a data file comprising the DRM header and an encrypted version of the plurality of groups of data streams, the creating comprising: encrypting the plurality of groups of data streams including the first and the second group of data streams; and
      combining the DRM header with the plurality of encrypted groups of data streams to form the data file; and
   providing an end-user, based on a plurality of different licenses comprising a first license and a second license, individual access to each of the plurality of encrypted groups of data streams comprising the encrypted first group of data streams and the encrypted second group of data streams in the data file via the DRM header in the data file, wherein:
      access of the encrypted first group of data streams is obtained through the end-user acquiring the first license that specifies a license strategy corresponding to the first business rule, and
      access of the encrypted second group of data streams is obtained through the end-user acquiring the second license that specifies a license strategy corresponding to the second business rule.

6. The computer-readable medium of claim 5, wherein the multiple data streams comprise any combination of one or more video, audio, and/or metadata data streams.

7. The computer-readable medium of claim 5, wherein the first group includes a metadata data stream, wherein the second group includes a different data stream of the data streams, the different data stream not being the metadata data stream, and wherein the metadata data stream is a value added aspect of the different data stream.

8. The computer-readable medium of claim 5, wherein providing an end user access comprises:
   communicating the first and second business rules to a license server; and
   sending the data file to a content distributor;
   wherein the license server and the content distributor are part of a Digital Rights Management computing system.

9. A computing device for licensing one or more data streams from an encoded digital media file, the computing device comprising:
   a processor; and
   a memory coupled to the processor, the memory comprising computer-program instructions stored thereon that, when executed by the processor, direct the processor to implement a method, the method comprising:
      accessing an encoded media file from a data source, the encoded media file comprising multiple data streams, each data stream representing a respective source of digital content that is different from source(s) associated with other respective ones of the data streams;

creating a plurality of groups comprising at least a first group and a second group, wherein:
- each one of the plurality of groups comprises one or more individual ones of the multiple data streams in the encoded media file, and
- each of the plurality of groups is independent of one another in that a combination of data streams in any one of the plurality of groups is not equivalent to a combination of data streams in any other one of the plurality of groups;

identifying a plurality of business rules comprising at least a first business rule and a second business rule, the first business rule being different than the second business rule, the plurality of business rules each providing a license strategy that indicates one or more of end-user licensing terms and options for accessing one group of the data streams;

generating a Digital Rights Management (DRM) header, the DRM header having information mapping the plurality of business rules to the plurality of groups of data streams, the mapping comprising:
- associating the first group of data streams with the first business rule; and
- associating the second group of data streams with the second business rule;
- wherein the DRM header is presented in eXtensible Markup Language (XML) data format;

creating a data file comprising the DRM header and an encrypted version of the plurality of groups of data streams, the creating comprising: encrypting the plurality of groups of data streams including the first and the second group of data streams; and
- combining the DRM header with the plurality of encrypted groups of data streams to form the data file; and providing an end-user, based on a plurality of different licenses comprising a first license and a second license, individual access to each of the plurality of encrypted groups of data streams comprising the encrypted first group of data streams and the encrypted second group of data streams in the data file via the DRM header in the data file, wherein:
- access of the encrypted first group of data streams is obtained through the end-user acquiring the first license that specifies a license strategy corresponding to the first business rule, and
- access of the encrypted second group of data streams is obtained through the end-user acquiring the second license that specifies a license strategy corresponding to the second business rule.

10. The computing device of claim 9, wherein the multiple data streams comprise any combination of one or more video, audio, and/or metadata data streams.

11. The computing device of claim 9, wherein the first group includes a metadata data stream, wherein the second group includes a different data stream of the data streams, the different data stream not being the metadata data stream, and wherein the metadata data stream is a value added aspect of the different data stream.

12. The computing device of claim 9, wherein providing an end-user access comprises:
- communicating the first and second business rules to a license server; and
- sending the data file to a content distributor;
- wherein the license server and the content distributor are part of a Digital Rights Management computing system.

13. A computing device for licensing one or more data streams from an encoded digital media file, the computing device comprising:

a processor;

memory coupled to the processor, the memory having computer-program instructions stored thereon that, when executed by the processor, direct the processor to implement:
- means for accessing an encoded media file from a data source, the encoded media file comprising multiple data streams, each data stream representing a respective source of digital content that is different from source(s) associated with other respective ones of the data streams;
- means for creating a plurality of groups comprising at least a first group and a second group, wherein:
  - each one of the plurality of groups comprises one or more individual ones of the multiple data streams in the encoded media file, and
  - each of the plurality of groups is independent of one another in that a combination of data streams in any one of the plurality of groups is not equivalent to a combination of data streams in any other one of the plurality of groups;
- means for identifying a plurality of business rules comprising at least a first business rule and a second business rule, the first business rule being different than the second business rule, the plurality of business rules each providing a license strategy that indicates one or more of end-user licensing terms and options for accessing one group of the data streams;
- means for generating a Digital Rights Management (DRM) header, the DRM header having information mapping the plurality of business rules to the plurality of groups of data streams, the mapping comprising:
  - associating the first group of data streams with the first business rule; and
  - associating the second group of data streams with the second business rule;
- means for creating a data file comprising the DRM header and an encrypted version of the plurality of groups of data streams, the creating comprising: encrypting the plurality of groups of data streams including the first and the second group of data streams; and
  - combining the DRM header with the plurality of encrypted groups of data streams to form the data file; and
- means for providing an end-user, based on a plurality of different licenses comprising a first license and a second license, individual access to each of the plurality of encrypted groups of data streams comprising the encrypted first group of data streams and the encrypted second group of data streams in the data file via the DRM header in the data file, wherein:
  - access of the encrypted first group of data streams is obtained through the end-user acquiring the first license that specifies a license strategy corresponding to the first business rule, and
  - access of the encrypted second group of data streams is obtained through the end-user acquiring the second license that specifies a license strategy corresponding to the second business rule.

14. The computing device of claim 13, wherein the multiple data streams comprise any combination of one or more video, audio, and/or metadata data streams.

15. The computing device of claim 13, wherein the first group includes a metadata data stream, wherein the second group includes a different data stream of the data streams, the different data stream not being the metadata data stream, and wherein the metadata data stream is a value added aspect of the different data stream.

16. The computing device of claim 13, wherein the means for providing comprise:
means for communicating the first and second business rules to a license server; and
means for sending the data file to a content distributor;
wherein the license server and the content distributor are part of a Digital Rights Management computing system.

17. A tangible computer-readable medium having stored thereon a data structure and computer-program instructions executable by a processor, the computer-program instructions when executed by the processor for performing operations using the data structure to license different combinations of one or more encrypted data streams from an encoded digital media file comprising multiple data streams, the data structure comprising:
a header data field having information for mapping a plurality of business rules to the different combination of the one or more encrypted data streams, the plurality of business rules comprising a first business rule and a second business rule, the different combination of the one or more encrypted data streams comprising a first group and a second group of the one or more encrypted data streams, the mapping comprising:
associating the first group of the one or more encrypted data streams with the first business rule; and
associating the second group of the one or more encrypted data streams with the second business rule, wherein:
the header data field is presented in eXtensible Markup Language (XML) data format;
the first group of the one or more encrypted data streams is not equivalent to the second group of the one or more encrypted data streams, and
the first business rule and second business rule each provides a different license strategy that indicates one or more of end-user licensing terms and options for accessing the first group and the second group of the one or more encrypted data streams mapped in the header; and
an encrypted data object data field for storing the one or more encrypted data streams, the encrypted data object comprising the first group and the second group of the one or more encrypted data streams;
wherein the header data field and the encrypted data field allow a content provider to make the one or more encrypted data streams in the first group and the second group individually accessible to an end-user through a plurality of different licenses comprising a first license and a second license; and
wherein the first group of encrypted data streams is accessible to the end-user upon the end-user acquiring the first license that specifies a license strategy corresponding to the first business rule and the second group of encrypted data stream is accessible to the end-user upon the end-user acquiring the second license that specifies a license strategy corresponding to the second business rule.

18. The computer-readable medium of claim 17, wherein the multiple data streams comprise any combination of one or more video, audio, and/or metadata data streams.

19. The computer-readable medium of claim 17, wherein the first group includes a metadata data stream of the multiple data streams, wherein the second group includes a different data stream of the of the multiple data streams, the different data stream not being the metadata data stream, and wherein the metadata data stream is a value added aspect of the different data stream.

20. A computing device comprising the processor and the tangible computer-readable medium of claim 17, the tangible computer-readable medium being coupled to the processor, and wherein the operations further comprising operations for licensing, using the data structure, different combinations of one or more data streams from the encoded digital media file.

* * * * *